(12) United States Patent
Chopra et al.

(10) Patent No.: US 11,163,647 B2
(45) Date of Patent: Nov. 2, 2021

(54) SYSTEM AND METHOD FOR SELECTION OF NODE FOR BACKUP IN DISTRIBUTED SYSTEM

(71) Applicant: EMC IP Holding Company LLC, Hopkinton, MA (US)

(72) Inventors: Shelesh Chopra, Bangalore (IN); Krishnendu Bagchi, Bangalore (IN); Vipin Kumar Kaushal, Bharthana Etawah (IN); Nitin Anand, Bangalore (IN); Pallavi Prakash, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 41 days.

(21) Appl. No.: 16/392,571

(22) Filed: Apr. 23, 2019

(65) Prior Publication Data

US 2020/0341852 A1 Oct. 29, 2020

(51) Int. Cl.
*G06F 11/14* (2006.01)
*G06F 9/455* (2018.01)

(52) U.S. Cl.
CPC ...... *G06F 11/1451* (2013.01); *G06F 9/45558* (2013.01); *G06F 11/1458* (2013.01); *G06F 2009/45562* (2013.01)

(58) Field of Classification Search
None
See application file for complete search history.

(56) References Cited

U.S. PATENT DOCUMENTS

| | | | |
|---|---|---|---|
| 7,395,244 B1 | 7/2008 | Kingsford | |
| 8,479,297 B1 | 7/2013 | Edukulla et al. | |
| 8,510,271 B1 | 8/2013 | Tsaur et al. | |
| 8,554,918 B1 | 10/2013 | Douglis | |
| 8,849,947 B1 | 9/2014 | Artzi et al. | |
| 9,037,547 B1 | 5/2015 | Shivdeo | |
| 9,092,248 B1 | 7/2015 | Makin et al. | |
| 9,256,725 B2 | 2/2016 | Oprea et al. | |
| 9,311,375 B1 | 4/2016 | Naik | |
| 9,632,875 B2 | 4/2017 | Raichstein et al. | |
| 9,658,925 B1 | 5/2017 | Damodharan et al. | |

(Continued)

OTHER PUBLICATIONS

Extended European Search Report issued in corresponding European Application No. 20166272.3, dated Sep. 28, 2020.

(Continued)

*Primary Examiner* — Charles Rones
*Assistant Examiner* — Ryan Dare
(74) *Attorney, Agent, or Firm* — Chamberlain, Hrdlicka, White, Williams & Aughtry

(57) ABSTRACT

A production host includes a persistent storage and a backup manager. The persistent storage stores virtual machine data and a service group list associated with an application service group. The backup manager obtains a backup generation request for the application service group that includes virtual machines, and each of the virtual machines uses a copy of the virtual machine data; in response to obtaining the backup generation request: identifies a first virtual machine the virtual machines that is prioritized for generating a backup for the application service group based on the service group list; attempts to generate the backup using the first virtual machine and the copy of the virtual machine data; and stores the backup in backup storage.

17 Claims, 14 Drawing Sheets

(56) References Cited

U.S. PATENT DOCUMENTS

| | | | |
|---|---|---|---|
| 9,678,965 B1 | 6/2017 | Wartnick et al. | |
| 9,740,577 B1 | 8/2017 | Chakraborty et al. | |
| 9,977,704 B1 | 5/2018 | Chopra et al. | |
| 10,061,657 B1 | 8/2018 | Chopra et al. | |
| 10,146,636 B1 | 12/2018 | Ghare et al. | |
| 10,216,583 B1 | 2/2019 | Krinke | |
| 10,339,012 B2 | 7/2019 | Hegdal | |
| 10,353,619 B1 | 7/2019 | Jha | |
| 10,437,487 B2* | 10/2019 | Balcha | G06F 11/1469 |
| 2004/0098423 A1 | 5/2004 | Chigusa | |
| 2007/0239755 A1 | 10/2007 | Mahoney | |
| 2008/0244601 A1 | 10/2008 | Zeis | |
| 2009/0320029 A1 | 12/2009 | Kottomtharayil | |
| 2010/0004400 A1 | 1/2010 | Fuse et al. | |
| 2010/0122248 A1 | 5/2010 | Robinson et al. | |
| 2010/0257523 A1 | 10/2010 | Frank | |
| 2011/0271150 A1 | 11/2011 | Bourne et al. | |
| 2012/0078846 A1 | 3/2012 | Gold et al. | |
| 2012/0150996 A1 | 6/2012 | Dubois et al. | |
| 2014/0059209 A1 | 2/2014 | Alnoor | |
| 2014/0095817 A1 | 4/2014 | Hsu et al. | |
| 2015/0154039 A1 | 6/2015 | Zada et al. | |
| 2015/0234713 A1 | 8/2015 | Shimada | |
| 2016/0048408 A1 | 2/2016 | Madhu et al. | |
| 2016/0232061 A1 | 8/2016 | Gaschler et al. | |
| 2016/0371153 A1 | 12/2016 | Dornemann | |
| 2016/0373291 A1* | 12/2016 | Dornemann | H04L 67/28 |
| 2017/0277597 A1 | 9/2017 | Dillon et al. | |
| 2018/0032409 A1 | 2/2018 | Surakanti et al. | |
| 2018/0039418 A1 | 2/2018 | Allen et al. | |
| 2018/0143990 A1 | 5/2018 | Figueroa et al. | |
| 2018/0225311 A1 | 8/2018 | Bandopadhyay et al. | |
| 2018/0314600 A1 | 11/2018 | Mori | |
| 2019/0129711 A1 | 5/2019 | Stopa et al. | |
| 2019/0286530 A1 | 9/2019 | Talley et al. | |
| 2020/0007620 A1 | 1/2020 | Das et al. | |
| 2020/0110638 A1 | 4/2020 | Asthana et al. | |
| 2020/0183652 A1 | 6/2020 | Krebs et al. | |
| 2020/0286103 A1 | 9/2020 | Sullivan | |
| 2020/0288206 A1 | 9/2020 | Bist et al. | |
| 2020/0341851 A1 | 10/2020 | Rana | |
| 2021/0004400 A1 | 1/2021 | Elkaim et al. | |

OTHER PUBLICATIONS

Extended European Search Report issued in corresponding European Application No. 20168729.0, dated Sep. 8, 2020.
Extended European Search Report issued in corresponding European Application No. 20169836.2, dated Sep. 8, 2020.

* cited by examiner

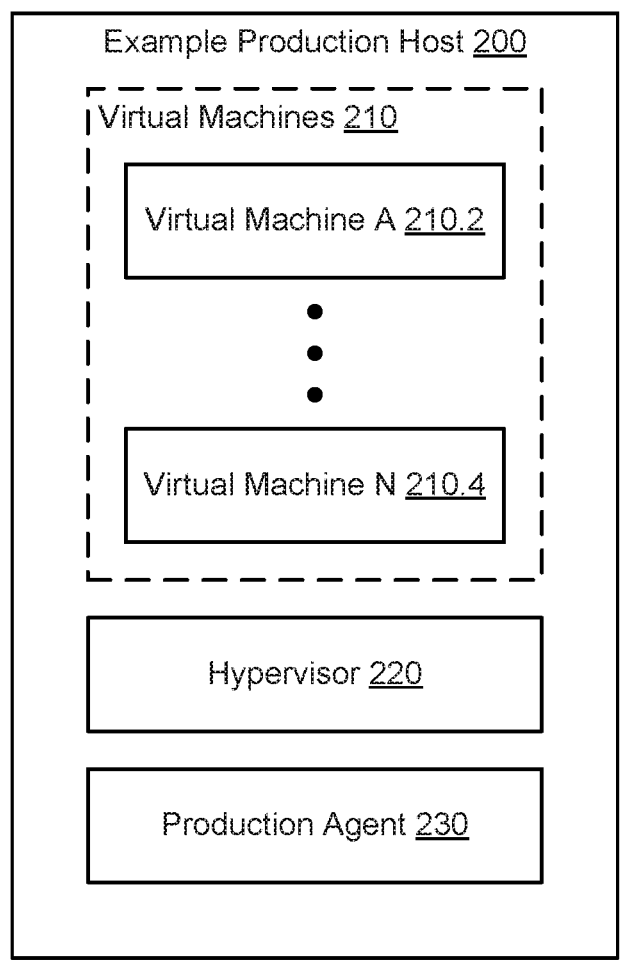
FIG. 2.1

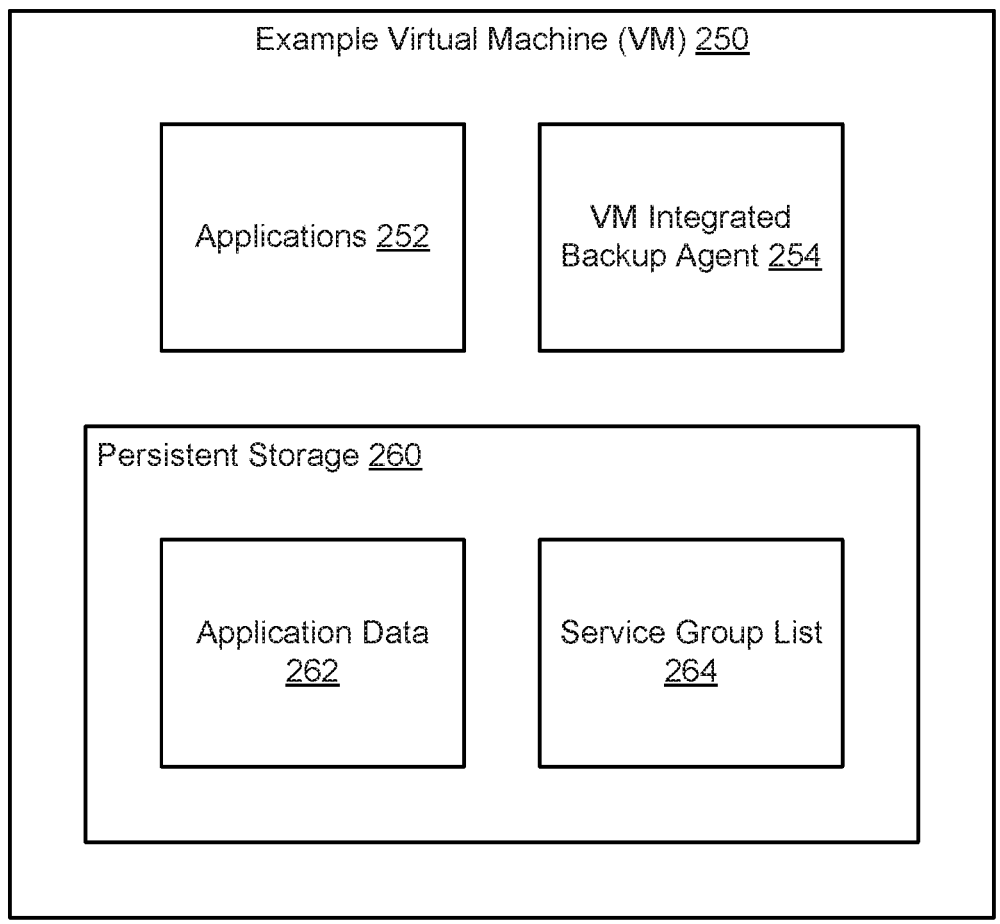
FIG. 2.2

Application Service Group 300 ——————— Service Type 302
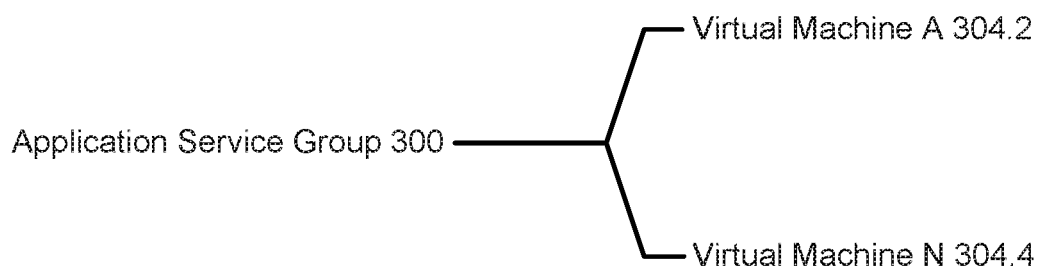
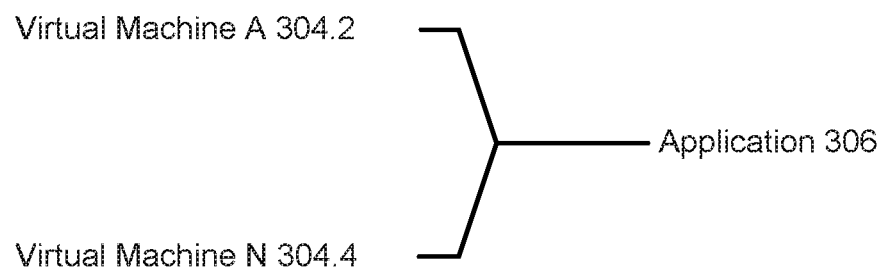
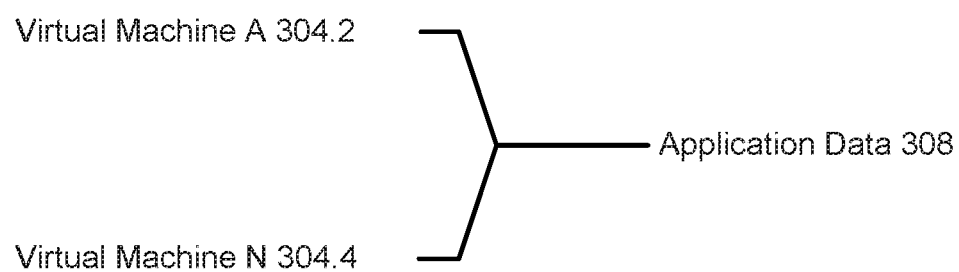
FIG. 3

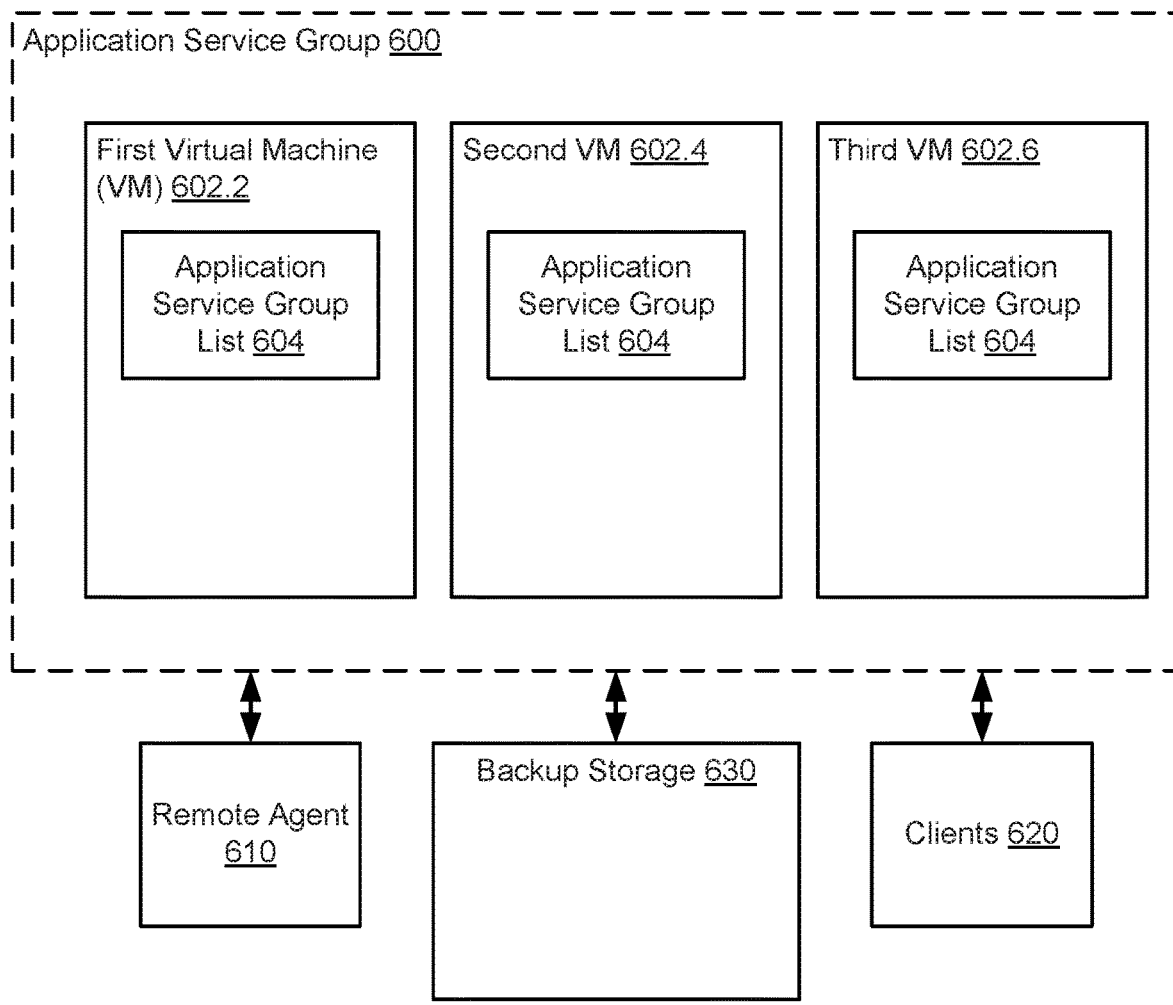
FIG. 6.1

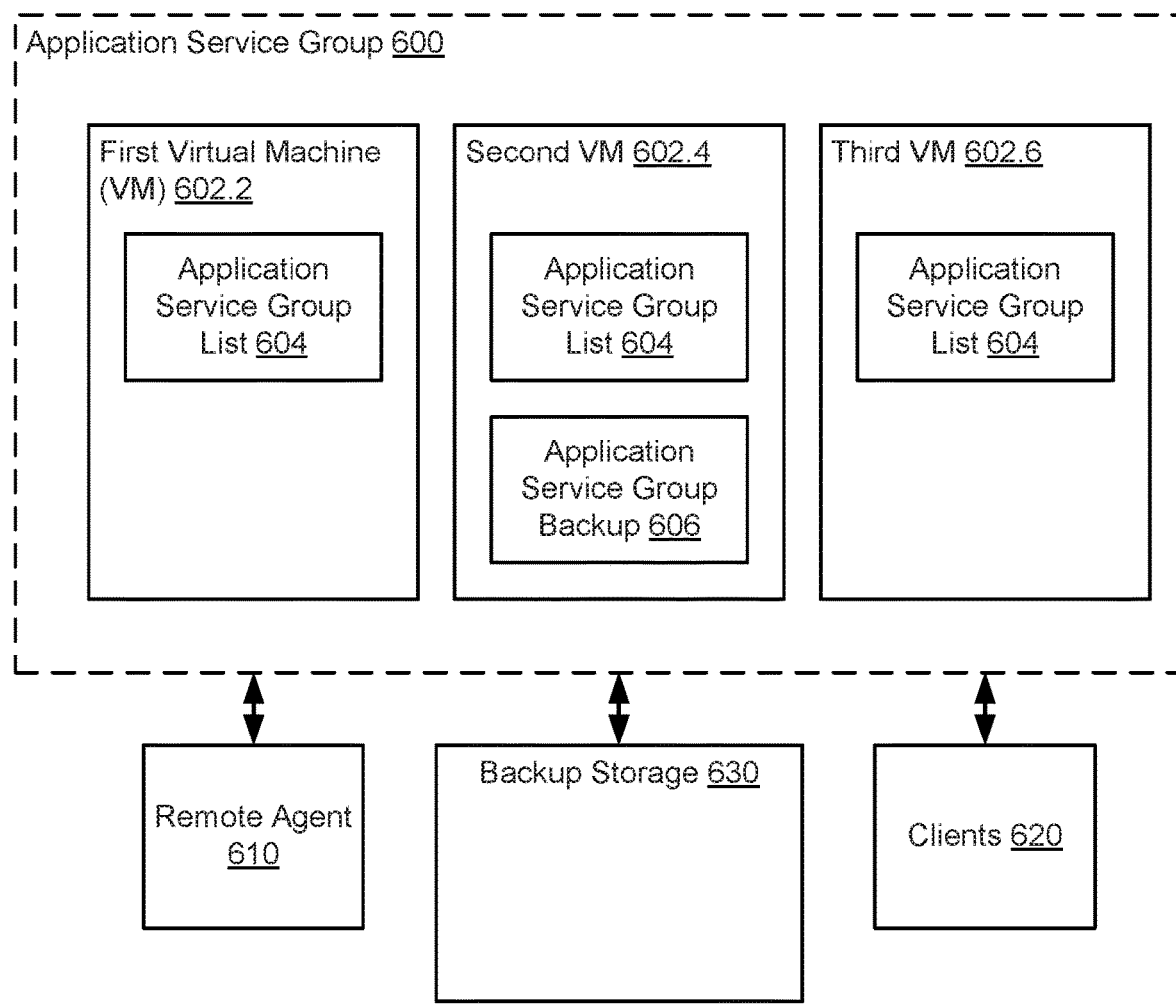
FIG. 6.2

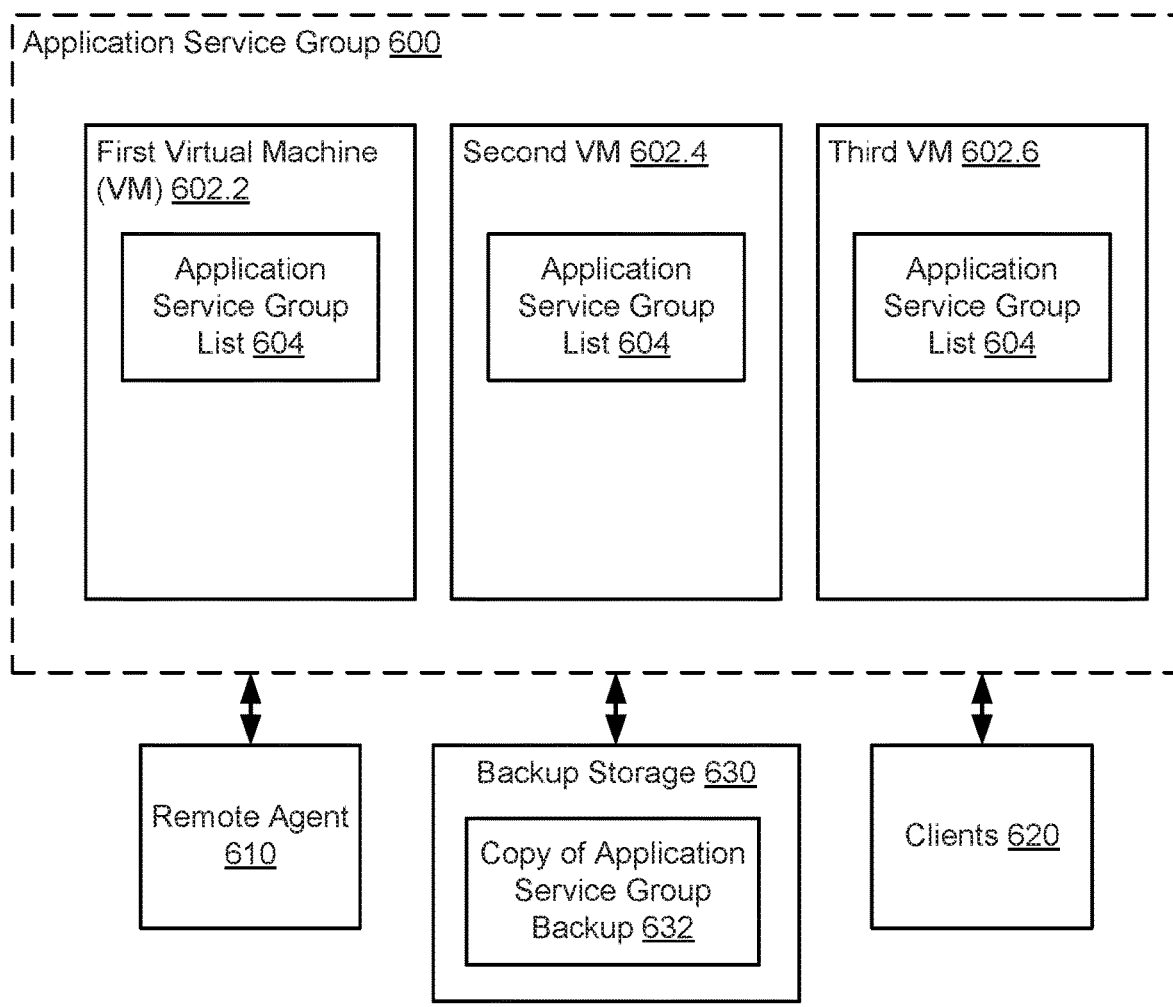
FIG. 6.3

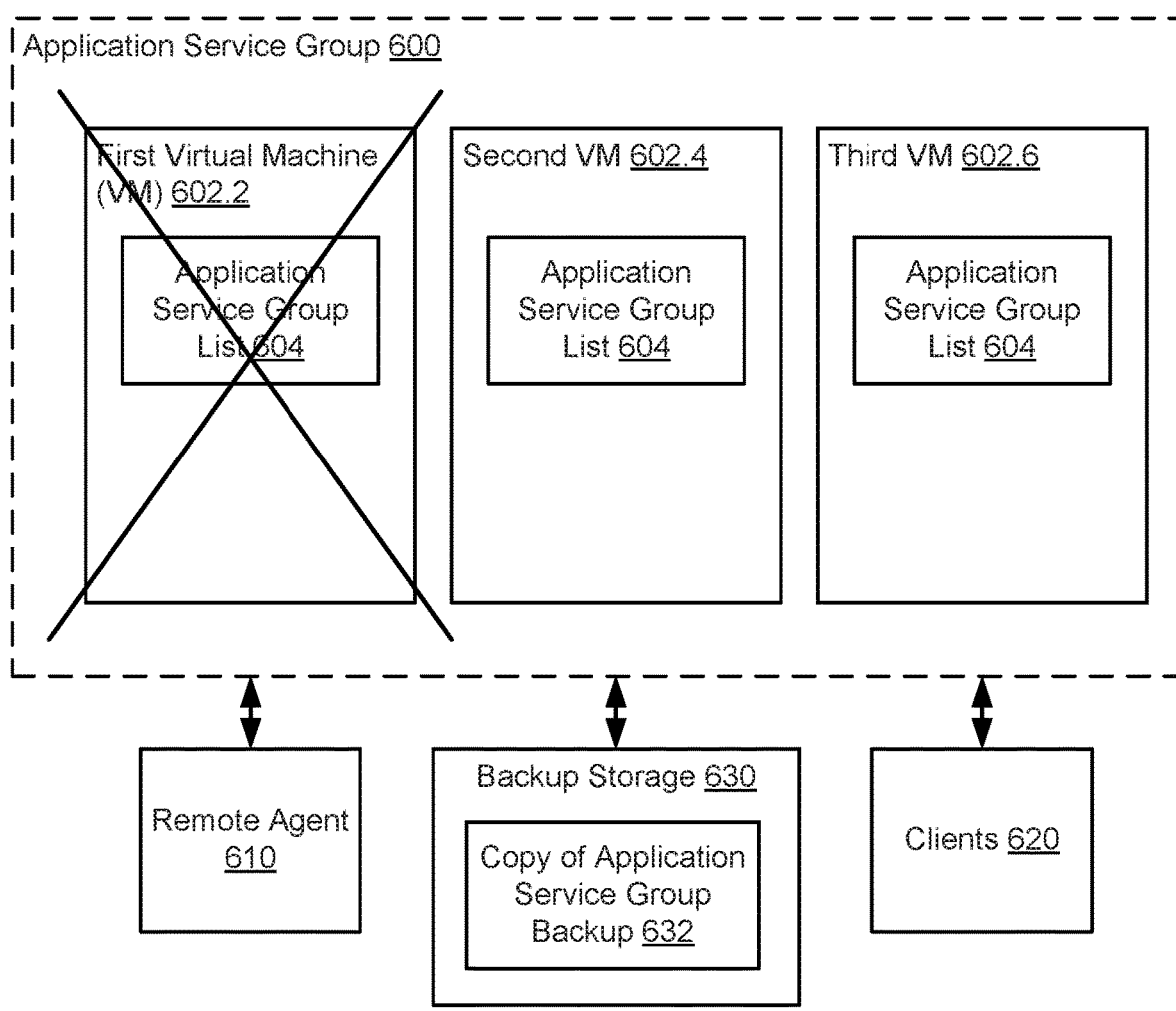
FIG. 6.4

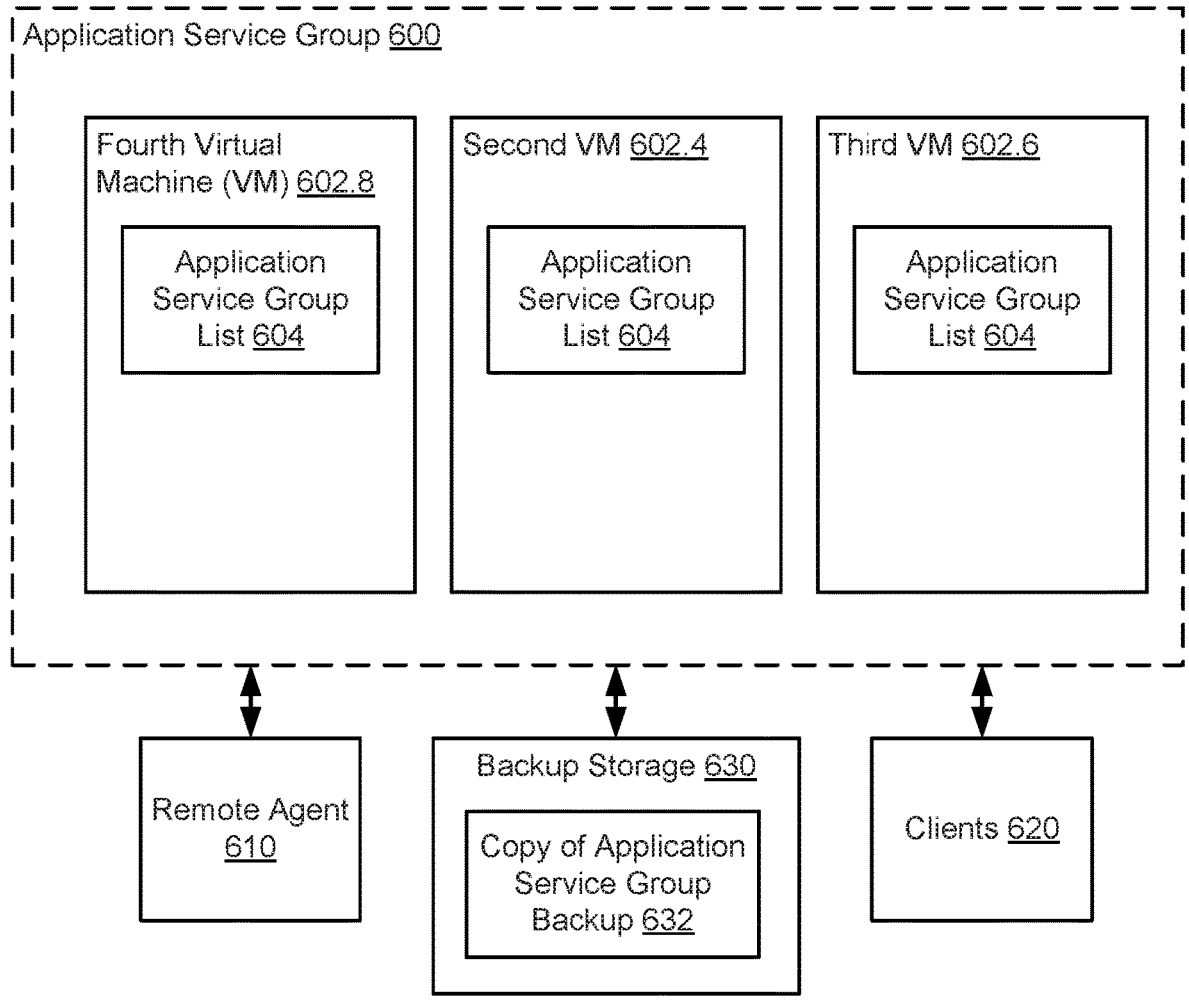
FIG. 6.5

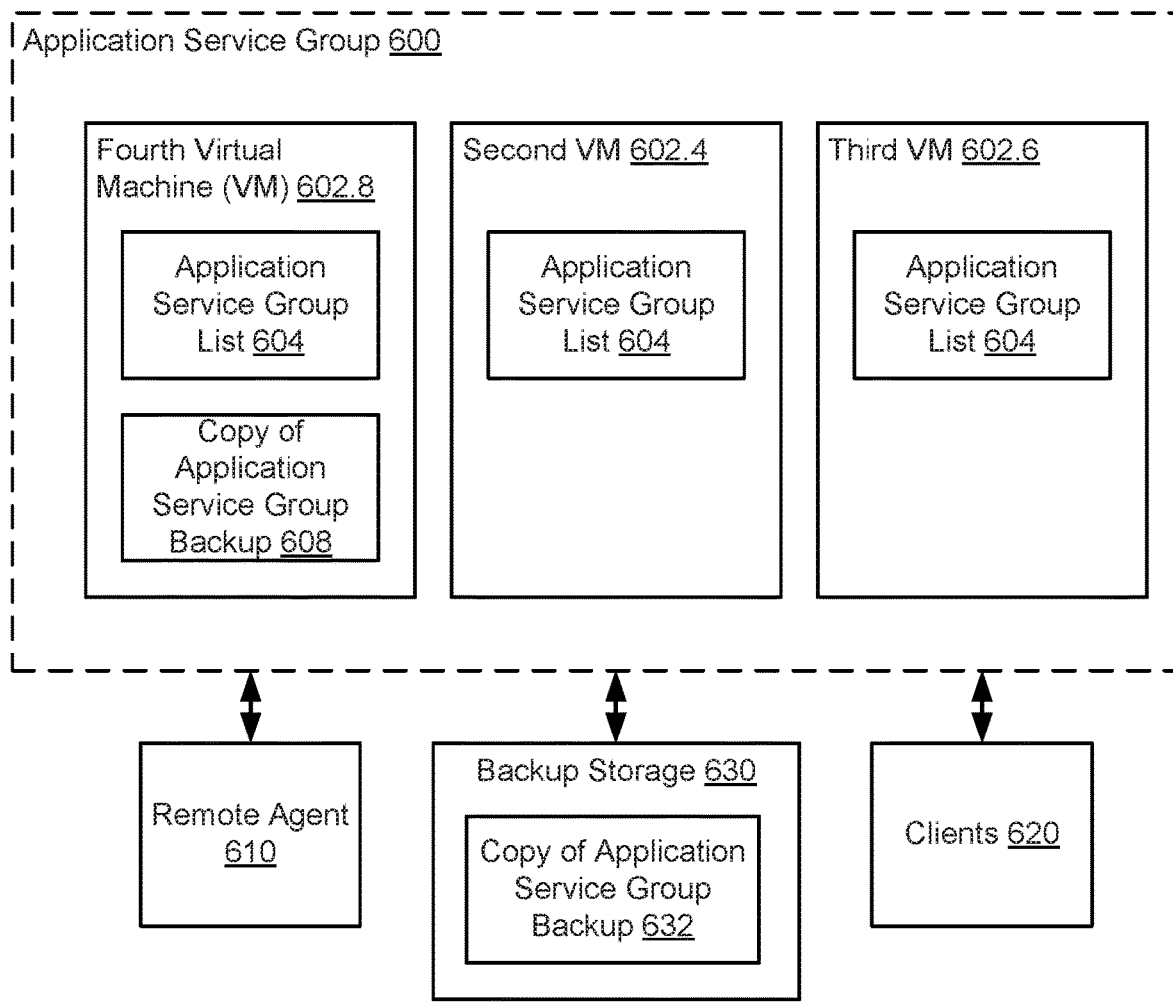
FIG. 6.6

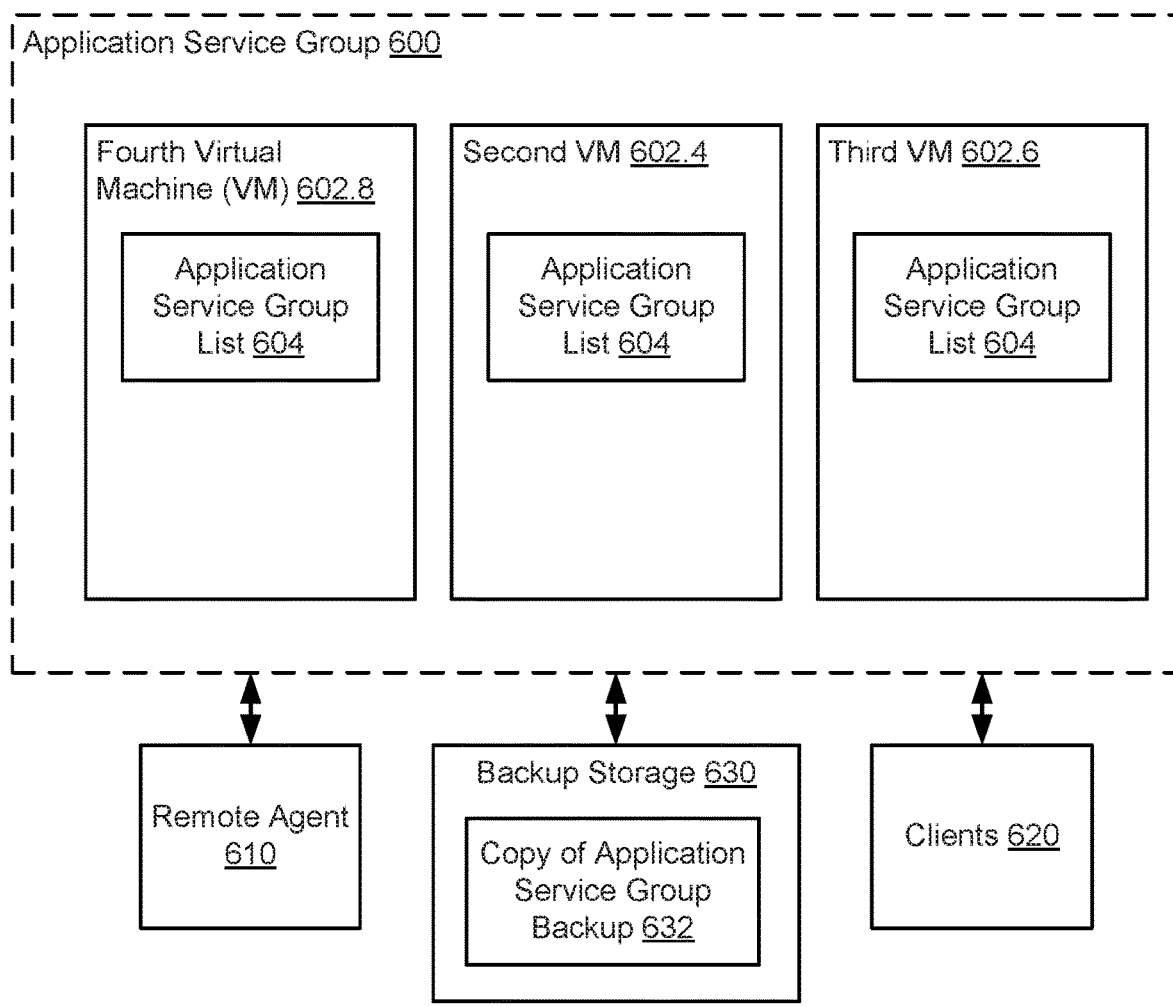
FIG. 6.7

SYSTEM AND METHOD FOR SELECTION OF NODE FOR BACKUP IN DISTRIBUTED SYSTEM

BACKGROUND

Computing devices may generate data during their operation. For example, applications hosted by the computing devices may generate data used by the applications to perform their functions. Such data may be stored in persistent storage of the computing devices. Failure of the persistent storage may result in data loss.

SUMMARY

In one aspect, a production host in accordance with one or more embodiments of the invention includes a persistent storage and a backup manager. The persistent storage stores virtual machine data and a service group list associated with an application service group. The backup manager obtains a backup generation request for the application service group that includes virtual machines, and each of the virtual machines uses a copy of the virtual machine data; in response to obtaining the backup generation request: identifies a first virtual machine the virtual machines that is prioritized for generating a backup for the application service group based on the service group list; attempts to generate the backup using the first virtual machine and the copy of the virtual machine data; and stores the backup in backup storage.

In one aspect, a method for providing backup services to an application service group in accordance with one or more embodiments of the invention includes obtaining a backup generation request for the application service group that includes virtual machines, and each of the virtual machines uses a copy of virtual machine data; in response to obtaining the backup generation request: identifying a first virtual machine of the virtual machines that is prioritized for generating a backup for the application service group based on a service group list associated with the application service group; attempting to generate the second backup using the second virtual machine and the copy of the virtual machine data; and storing the backup in backup storage.

In one aspect, a non-transitory computer readable medium in accordance with one or more embodiments of the invention includes computer readable program code, which when executed by a computer processor enables the computer processor to perform a method for providing backup services to an application service group. The method includes obtaining a backup generation request for the application service group that includes virtual machines, and each of the virtual machines uses a copy of virtual machine data; in response to obtaining the backup generation request: identifying a first virtual machine of the virtual machines that is prioritized for generating a backup for the application service group based on a service group list associated with the application service group; attempting to generate the second backup using the second virtual machine and the copy of the virtual machine data; and storing the backup in backup storage.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 2.1 shows a diagram of an example production host in accordance with one or more embodiments of the invention.

FIG. 2.2 shows a diagram of an example virtual machine in accordance with one or more embodiments of the invention.

FIG. 3 shows a relationship diagram of relations between components of the system of FIG. 1 in accordance with one or more embodiments of the invention.

FIGS. 6.1-6.7 show a non-limiting example of a system in accordance with embodiments of the invention.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for providing data protection services in a distributed system. A distributed system in accordance with embodiments of the invention may provide services to clients. To improve the liability of providing such services, multiple components of the distributed system may be tasked to cooperatively provide services.

In one or more embodiments of the invention, the distributed system maintains multiple copies of data for data integrity purposes. To manage the process of generating and storing the copies of the data, the distributed system may include one or more remote agents. A remote agent may be a centralized entity that manages the process of generating backups.

To reduce the computational load of managing the generation and storage of backups, the remote agents may limit their oversight of the backup generation process. For example, the remote agents may only initiate a backup generation for groups of entities tasked with providing services to the clients. Once initiated, the groups of entities may cooperatively organize the generation and storage of the backups. By doing so, the computational load for centralized entities may be reduced when compared to centralized entities that heavily oversee the process of generating and/or storing backups. Consequently, a remote agent in accordance with embodiments of the invention may orchestrate generation and storage of backups for a larger number of entities when compared to other backup generation systems.

Figure 1:
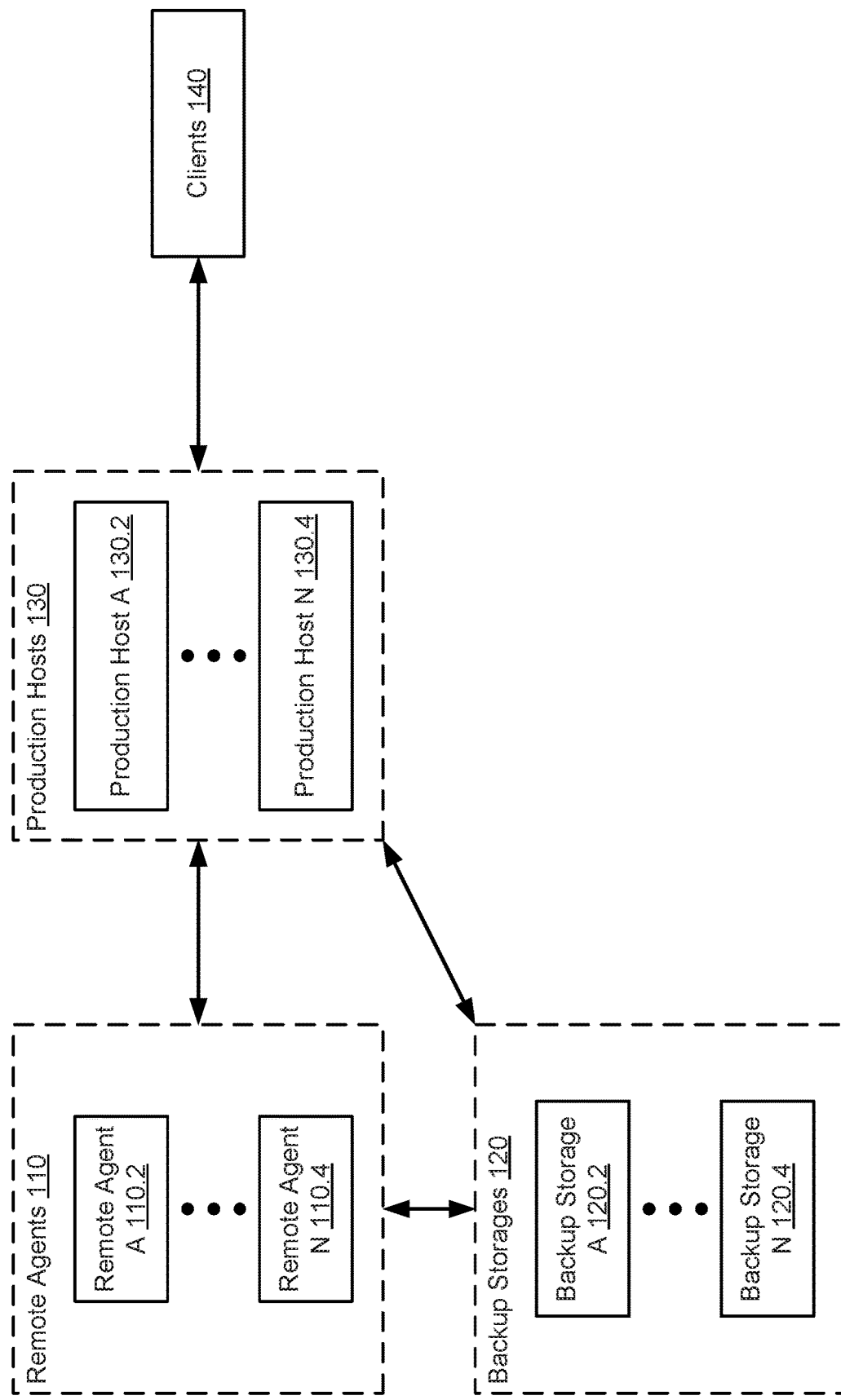
FIG. 1 shows a diagram of a system in accordance with one or more embodiments of the invention.

FIG. 1 shows an example system in accordance with one or more embodiments of the invention. The system may include clients (140) that obtain services from virtual machines and/or applications hosted by production hosts (130). For example, the production hosts (130) may host virtual machines that host applications. The clients (140) may utilize application services of the applications. The applications may be, for example, database applications, electronic communication applications, file storage applications, and/or any other type of application that may provide services to the clients (140). By utilizing such services, data that is relevant to the clients (140) may be stored in the production hosts (130).

To improve the reliability of providing application services, logical groupings of entities hosted by the production hosts (130) may cooperatively provide the application services. For example, multiple virtual machines may be logically grouped into an application service group that provides a particular type of application service. In one or more embodiments of the invention, a portion of the virtual machines of an application service group provide failover services for other virtual machines of the application service group. In other words, some of the virtual machines may not actually provide application services until one or more of the other virtual machines, or applications hosted by the virtual machines fails. In such a scenario, the portion of the virtual machines may start providing application services as a failover service.

To improve the likelihood that data stored in the production hosts (130) is available for future use, backups of the production hosts (130) may be generated and stored in the backup storages (120). A backup of one of the production hosts (130) may include data that may be used to restore all, or a portion, of the production host, or all, or a portion, of an entity hosted by the production host, to a previous state. Thus, if data hosted by one of the production hosts (130) is lost, access to the data may be restored by restoring all, or a portion, of the production host using information stored in the backup storages (120).

To provide backup services to an application service group, one of the entities of the application service group may generate the backup for the entire service group. For example, to maintain failover capability, each, or a portion, of the virtual machines of the application service group may consistently maintain the same application data for the application service provided by the application service group. Thus, when a backup of one of the virtual machines in generated, the backup may include such data that any of the entities of the application service group may be restored using that data. Consequently, only a single backup may need to be generated for an application service group for all, or a portion, of the entities of the application service group to be backed up.

The system may also include remote agents (110) that provide data protection services to the production hosts (130). The data protection services may include orchestrating generation and storage of backups in the backup storages and/or orchestrating restorations using the data stored in the backup storages (120). Performing a restoration may return the production host, or an entity hosted by the production host, to a previous state.

To perform a backup for an application service group, the remote agents (110) may send a backup generation request to one or more of the entities of the application service group. In response, the entities of the application service group may internally coordinate the group to select an appropriate entity of the application service group to generate the backup. By doing so, the computational load for orchestrating restoration may be shared by the application service group, rather than the remote agents (110). For example, after sending the backup generation request to the application service group, the remote agents (110) may not need to otherwise monitor the process of backup generation.

The components of the system illustrated in FIG. 1 may be operably connected to each other and/or operably connected to other entities (not shown) via any combination of wired and/or wireless networks. Each component of the system illustrated in FIG. 1 is discussed below.

The clients (140) may be computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application and/or all, or a portion, of the methods illustrated in FIGS. 4-5. The clients (140) may be other types of computing devices without departing from the invention. For additional details regarding computing devices, refer to FIG. 7.

The clients (140) may be logical devices without departing from the invention. For example, the clients (140) may be virtual machines that utilize computing resources of any number of physical computing devices to provide the functionality of the clients (140). The clients (140) may be other types of logical devices without departing from the invention.

In one or more embodiments of the invention, the clients (140) utilize application services provided by the production hosts (130). For example, the clients (140) may utilize database services, electronic communication services, file storage services, or any other type of computer implemented service provided by applications hosted by the production hosts (130). By utilizing the aforementioned services, data that is relevant to the clients (140) may be stored as part of application data of the applications hosted by the production hosts (130).

For example, consider a scenario in which a client utilizes file storage services, provided by an application hosted by the production hosts (130), by uploading an image to an application hosted by the production hosts (130). In response to receiving the uploaded image, the application may store a copy of the image locally in the production hosts (130). At a future point in time, the client that uploaded the image, or another entity, may desire to retrieve a copy of the image from the production hosts (130) and thereby render data, i.e., the copy of the image sort of the production hosts (130), stored in the production hosts (130) to be relevant to the clients (140). One or more embodiments of the invention may improve the likelihood that data that is relevant to the clients (140) and stored in the production hosts (130) is retrievable from the production hosts (130) at future points in time. Embodiments of the invention may provide such functionality by generating and storing backups of the production hosts, or a portion of the production hosts, in the backup storages (120).

In one or more embodiments of the invention, the production hosts (130) are computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application and/or all, or a portion, of the methods illustrated in FIGS. 4-5. The production hosts (130) may be other types of computing devices without departing from the invention. For additional details regarding computing devices, refer to FIG. 7.

In one or more embodiments of the invention, the production hosts (130) are distributed computing devices. As used herein, a distributed computing device refers to functionality provided by a logical device that utilizes the computing resources of one or more separate and/or distinct physical computing devices. For example, in one or more embodiments of the invention, the production hosts (130) may be distributed devices that include components distributed across any number of separate and/or distinct computing devices. In such a scenario, the functionality of the production hosts (130) may be performed by multiple, different computing devices without departing from the invention.

A system in accordance with one or more embodiments of the invention may include any number of production hosts (e.g., 130.2, 130.4) without departing from the invention. For example, a system may include a single production host (e.g., 130.2) or multiple production hosts (e.g., 130.2, 130.4).

In one or more embodiments of the invention, the production hosts (130) provide services to the clients (140). The services may be any type of computer implemented service such as, for example, database services, electronic communication services, data storage services, and/or instant messaging services. When providing such services to the clients (140), data that is relevant to the clients (140) may be stored in persistent storage of the production hosts (130).

In one or more embodiments of the invention, the production hosts (130) perform backup services such as, for example, generating and storing backups in backup storages (120). By storing backups in the backup storages (120), copies of data stored in persistent storage of the production hosts (130) may be redundantly stored in the backup storages (120). By redundantly storing copies of data in both the production hosts (130) and the backup storages (120), it may be more likely that the stored data will be able to be retrieved at a future point in time. For example, if a production host (e.g., 130.2) suffers a catastrophic failure or other type of data loss/corruption event, the data on the production host's persistent storage may be lost. However, because a copy of the data may be stored in the backup storages (120), it may be possible to retrieve the data for use after the catastrophic failure. Thus, embodiments of the invention may improve the reliability of data storage in a distributed system. For additional details regarding the production hosts (130), refer to FIG. 2.1.

In one or more embodiments of the invention, the backup storages (120) are computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to provide the functionality of the backup storages (120) described through this application and all, or a portion, of the methods illustrated in FIG. 4-5. The backup storages (120) may be other types of computing devices without departing from the invention. For additional details regarding computing devices, refer to FIG. 7.

In one or more embodiments of the invention, the backup storages (120) are distributed computing devices. As used herein, a distributed computing device refers to functionality provided by a logical device that utilizes the computing resources of one or more separate and/or distinct computing devices. For example, in one or more embodiments of the invention, the backup storages (120) are distributed devices that include components distributed across any number of separate and/or distinct computing devices. In such a scenario, the functionality of the backup storages (120) may be performed by multiple, different computing devices without departing from the invention.

In one or more embodiments of the invention, the backup storages (120) provide data storage services to the production hosts (130). The data storage services may include storing of data provided by the production hosts (130) and providing of previously stored data to the production hosts (130). Such provided data may be used for restoration (and/or other) purposes. The system may include any number of backup storages (e.g., 120.2, 120.4) without departing from the invention. For example, the system in accordance with embodiments of the invention may only include a single backup storage (e.g., 120.2) or may include multiple backup storages (e.g., 120.2, 120.4).

In one or more embodiments of the invention, the data stored by the backup storages (120) includes backups of virtual machines and/or applications hosted by the production hosts (130). For example, the production hosts (130) may host a virtual machine that hosts a database application. To generate backups of the database, a backup of the virtual machine hosting the database may be generated and the backup may be sent to the backup storages (120) for storage. At a future point in time, it may become desirable to restore the state of the database managed by the database application to a previous state. To do so, the previously stored backup of the virtual machine stored in the backup storages (120) may be retrieved. The retrieved backup may be used to restore the application data hosted by the virtual machine hosting the database to a state associated with the backup, i.e., the desired previous state. The backup storages (120) may provide similar functionality for application level backups. In other words, different types of backups may be utilized to provide restoration services at different levels of granularity, e.g., host level, virtual machine level, application level, etc.

While described above as storing backups of virtual machines, applications, and/or production hosts (130), the backup storages (120) may store other types of data from the production hosts (130), or other entities, without departing from the invention. For example, the backup storages (120) may store archives or other data structures from the clients (140) and/or other entities.

In one or more embodiments of the invention, the remote agents (110) are computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to provide the functionality of the remote agents (110) described through this application and all, or a portion, of the methods illustrated in FIG. 4-5. The remote agents (110) may be other types of computing devices without departing from the invention. For additional details regarding computing devices, refer to FIG. 7.

In one or more embodiments of the invention, the remote agents (110) are distributed computing devices. As used herein, a distributed computing device refers to functionality provided by a logical device that utilizes the computing resources of one or more separate and/or distinct computing devices. For example, in one or more embodiments of the invention, the remote agents (110) may be distributed devices that include components distributed across any number of separate and/or distinct computing devices. In such a scenario, the functionality of the remote agents (110) may be performed by multiple, different computing devices without departing from the invention.

In one or more embodiments of the invention, the backup storages (120) provide the functionality of the remote agents. For example, the backup storages (120) may host applications that provide all, or a portion, of the functionality of the remote agents (110).

In one or more embodiments of the invention, the remote agents (110) orchestrate provisioning of backup services to the production hosts (130). For example, the remote agents (110) may initiate the process of backup generation for the production hosts (130) and storage of the generated backups in the backup storages (120). Additionally, the remote agents (110) may orchestrate restoration of the production hosts (130) and/or entities hosted by the production hosts using backups stored in the backup storages (120). For example, remote agents (110) may initiate copying of backups from the backup storages to the production hosts (130) and may initiate restorations using the copied backups. The system of FIG. 1 may include any number of remote agents (e.g., 110.2, 110.4).

In one or more embodiments of the invention, the remote agents (110) orchestrate backup services for application service groups. As noted above, an application group may be any number of entities hosted by the production hosts (130) that cooperatively provide a type of application service. To provide backup generation services to application service groups, the remote agents (110) may send a backup generation request to one or more entities of a particular application service group. The remote agents (110) may maintain a listing of the entities associated with each of the application groups.

Once a backup generation request is sent to one or more entities of the application service group, the remote agents (110) may not monitor the backup generation process, select an entity of the application service group for generating the backup, or otherwise direct the process of generating the backup for the application service group. Rather, the remote agents (110) may rely on the entities of the application service group to appropriately administer generation of the backup. Once generated, the remote agents (110) may receive information, e.g., where the backup is stored, backup generation time, etc., regarding the generated backup from the production hosts (130).

While the system of FIG. 1 has been described and illustrated as including a limited number of components for the sake of brevity, a system in accordance with embodiments of the invention may include additional, fewer, and/or different components than those illustrated in FIG. 1 without departing from the invention.

As discussed above, production hosts may host virtual machines, applications, or other entities that provide services to the clients. FIG. 2.1 shows a diagram of an example production host (200) in accordance with one or more embodiments of the invention. The example production host (200) may be similar to any of the production hosts (130, FIG. 1). As discussed above, the example production host (200) may provide: (i) application services to the clients, (ii) backup services to the entities that provide the application services to the clients, and (iii) restoration services for the entities that provide the application services to the clients.

To provide the aforementioned functionality of the example production host (200), the example production host (200) may include virtual machines (210), a hypervisor (220), and a production agent (230). Each component of the example production host (200) is discussed below.

The virtual machines (210) may be applications. For example, the virtual machines (210) may be applications executing using physical computing resources of the example production host (200) and/or other entities. In other words, each of the virtual machines (210) may be implemented as computer instructions stored on a persistent storage that when executed by a processor of the example production host (200) and/or other entities give rise to the functionality of the respective virtual machine. The example production host (200) may host any number of virtual machines (e.g., 210.2, 210.4) without departing from the invention.

Each of the virtual machines (210) may host any number of applications. The applications may provide application services to clients or other entities. For example, the applications may be database applications, electronic communication applications, file sharing applications, and/or other types of applications. Each of the virtual machines (210) may host any number of applications without departing from the invention.

Each of the applications may perform similar or different functions. For example, a first application may be a database application and a second application may be an electronic communications application. In another example, a first application may be a first instance of a database application and a second application may be a second instance of the database application.

In one or more embodiments of the invention, all, or a portion, of the applications provide application services to clients. The provided services may correspond to the type of application of each of the applications. When providing application services to the clients, data that is relevant to the clients may be received by and/or generated by the applications. The applications may store such relevant data as part of the application data associated with respective applications in persistent storage of the example production host (200) and/or other entities.

In some embodiments of the invention, portions, or all, of the application data may be stored remotely from the example production host (200). For example, the application data may be stored in a second production host, or another entity, that does not host the applications. The application data may be stored in other locations without departing from the invention.

While the applications have been described above as being hosted by the virtual machines (210), the applications may not be hosted by virtual machines without departing from the invention. For example, the applications may be executing natively on the example production host (200) rather than in a virtualized entity, e.g., one of the virtual machines (210).

As discussed above, some or all of the virtual machines (210.2, 210.4) hosted by the example production host (200) and/or other production hosts may cooperatively provide application services. In such a scenario, the virtual machines may be logically grouped into application services groups. For additional detail regarding the logical grouping and functionality of the application services groups, refer to FIG. 3. For additional details regarding the virtual machines (210), refer to FIG. 2.2.

The hypervisor (220) may manage execution of the virtual machines (210). The hypervisor (220) may instantiate and/or terminate any of the virtual machines (210). The hypervisor (220) may also allocate computing resources of the example production host (200) to each of the virtual machines (e.g., 210.2, 210.4).

For example, the hypervisor (220) may allocate a portion of the persistent storage of the example production host (200). Any quantity of storage resources of the persistent storage may be allocated in any manner among the virtual machines (e.g., 210.2, 210.4).

While discussed with respect to storage resources, the hypervisor (220) may allocate other types of computing resources to the virtual machines (210), and/or other entities hosted by the example production host (200), without departing from the invention. For example, the hypervisor (220) may allocate processor cycles, memory capacity, memory bandwidth, and/or network communication bandwidth among the virtual machines (210) and/or other entities hosted by the example production host (200).

In one or more embodiments of the invention, the hypervisor (220) is a hardware device including circuitry. The hypervisor (220) may be, for example, a digital signal processor, a field programmable gate array, or an application specific integrated circuit. The hypervisor (220) may be other types of hardware devices without departing from the invention.

In one or more embodiments of the invention, the hypervisor (220) is implemented as computer code stored on a persistent storage that when executed by a processor performs the functionality of the hypervisor (220). The processor may be a hardware processor including circuitry such as, for example, a central processing unit or a microcontroller. The processor may be other types of hardware devices for processing digital information without departing from the invention.

The production agent (230) may locally manage provisioning of backup services to the virtual machines (210) and/or entities hosted by the virtual machines (210). For example, the production agent (230) may orchestrate the generation of backups and storage of the generated backups in backup storages (120, FIG. 1). To orchestrate the generation of backups, the production agent (230) may generate virtual machine level backups. A virtual machine level backup may be a backup that represents the state (or difference from one state to another state) of a virtual machine at a point in time.

In one or more embodiments of the invention, the production agent (230) manages the provisioning of backup services for the virtual machines (210) based on instructions received from one or more remote agents. These instructions may cause the production agent (230) to take action to provide the backup services. In other words, the production agent (230) may orchestrate data protection services including generation of backups and performance of restorations across the system. To do so, the production agent (230) may send instructions to a virtual machine integrated backup manager hosted by each of the virtual machines (210). For additional details regarding virtual machine integrated backup managers, refer to FIG. 2.2.

In one or more embodiments of the invention, the production agent (230) includes functionality to report backup generation activity to remote agents. For example, the production agent (230) may monitor backups that are generated and send notifications of the generated backups to the remote agents. By doing so, remote agents may be notified of the backup generations for the entities hosted by the example production host (200). The production agent (230) may provide additional information regarding generated backups to the remote agents without departing from the invention.

The production agent (230) may also provide restoration services. Restoration services may enable entities that are now inaccessible due to, for example, failure of a host entity such as a production host, to be instantiated in other locations and being in predetermined states. To provide restoration services, the production agent (230) may obtain any number of backups from backup storage and restore the entity using the backups. For example, a production agent (230) may obtain a virtual machine level backup and instantiate a copy of a virtual machine using the obtained backup. By doing so, a virtual machine may be restored in a state hosting an application in a predetermined state. Once in the predetermined state, the application may provide desired application services and/or enable access to application data of the application. The entities may be restored to different, desirable states using different combinations of previously generated backups and/or portions of the backups. For example, an application level backup corresponding to application data may be used to selectively restore an application hosted by a virtual machine by modifying the data of the virtual machine using the application level backup. In this manner, both virtual machine level and application level restorations may be performed. Any combination of backups may be used to restore entities to any number of states without departing from the invention.

Figure 4:
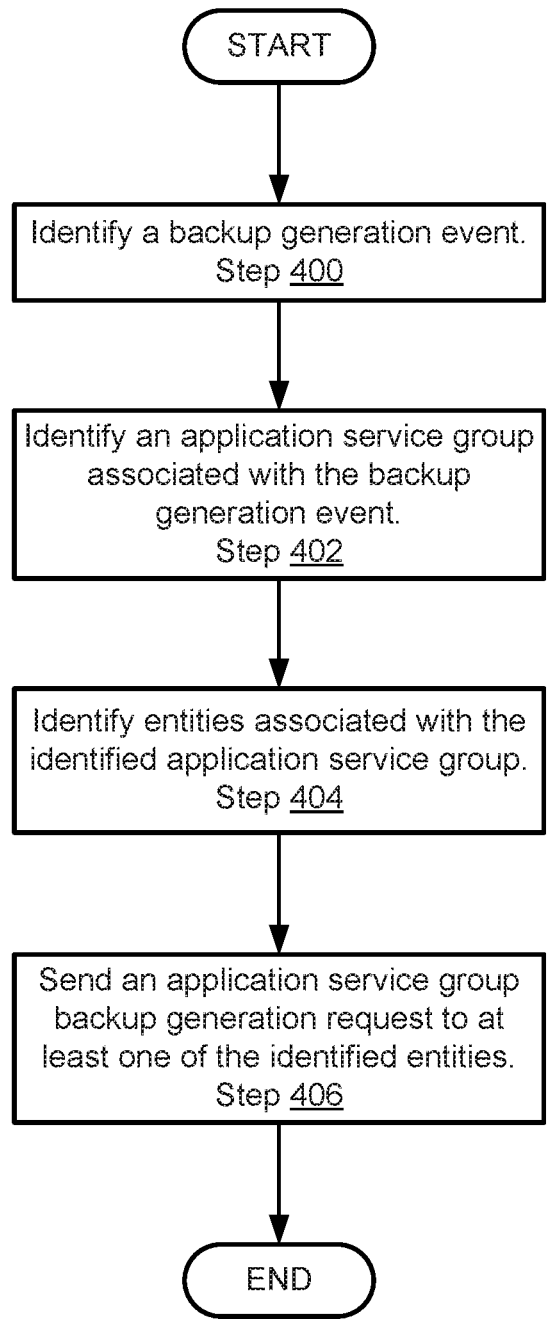
FIG. 4 shows a flowchart of a method of orchestrating generation of a backup in accordance with one or more embodiments of the invention.
Figure 5:
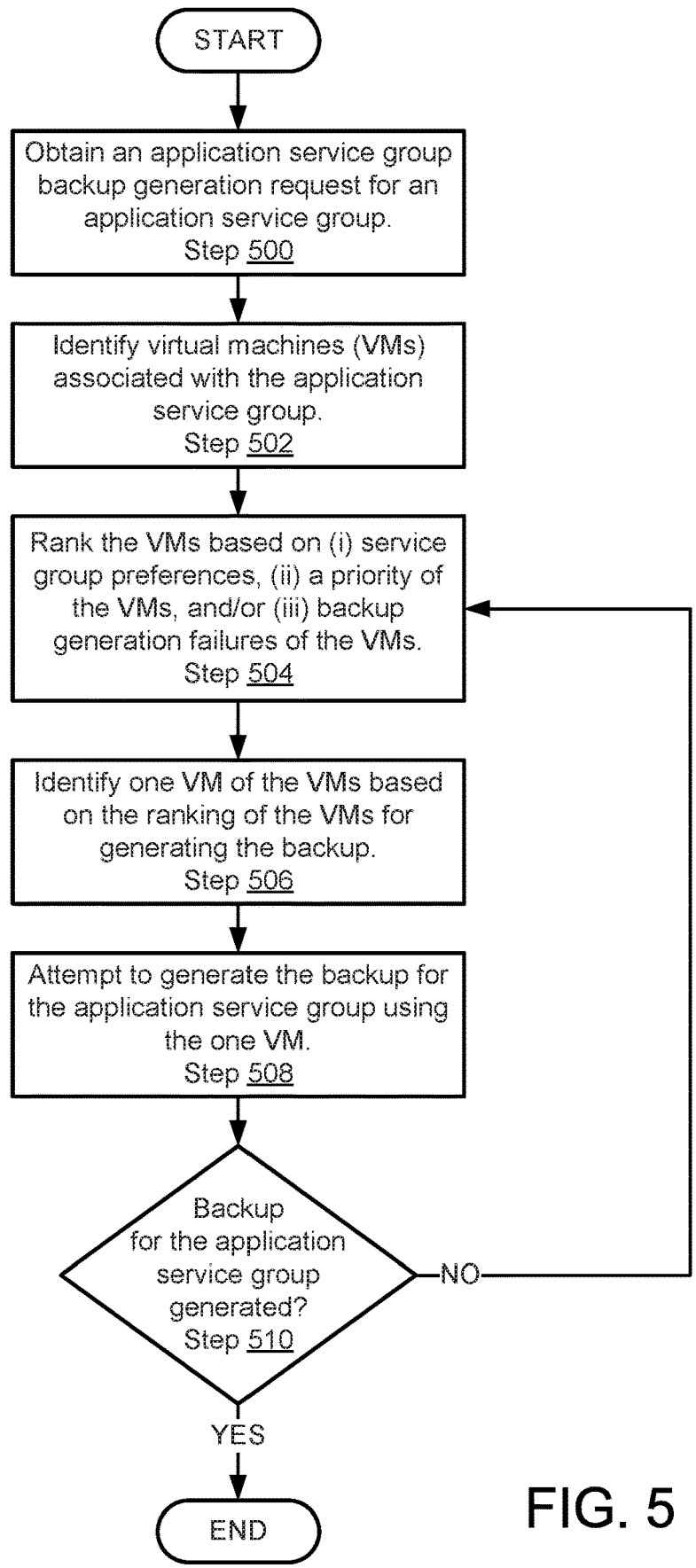
FIG. 5 shows a flowchart of a method of performing a backup generation in accordance with one or more embodiments of the invention.

To provide the above noted functionality of the production agent (230), the production agent (230) may perform all, or a portion, of the methods illustrated in FIGS. 4-5. The production agent (230) may do so by sending instructions for all, or a portion, of the process to a virtual machine integrated backup manager hosted by the virtual machines (210).

In one or more embodiments of the invention, the production agent (230) is a hardware device including circuitry. The production agent (230) may be, for example, a digital signal processor, a field programmable gate array, or an application specific integrated circuit. The production agent (230) may be other types of hardware devices without departing from the invention.

In one or more embodiments of the invention, the production agent (230) is implemented as computing code stored on a persistent storage that when executed by a processor performs the functionality of the production agent (230). The processor may be a hardware processor including circuitry such as, for example, a central processing unit or a microcontroller. The processor may be other types of hardware devices for processing digital information without departing from the invention.

While the example production host (200) of FIG. 2.1 has been described and illustrated as including a limited number of components for the sake of brevity, a production host in accordance with embodiments of the invention may include additional, fewer, and/or different components than those illustrated in FIG. 2.1 without departing from the invention.

As discussed above, virtual machines hosted by the production hosts may provide services to clients. FIG. 2.2 shows a diagram of an example virtual machine (250) in accordance with one or more embodiments of the invention.

The example virtual machine (250) may host any number and type of applications (252). The applications (252) may provide services to clients and/or other entities. The applications (252) may generate application data (262) which is stored in the persistent storage (260).

The example virtual machine (250) may also host a virtual machine integrated backup agent (254). The virtual machine integrated backup agent (254) may provide data protection services including (i) maintaining a service group list (264), (ii) identifying a virtual machine of an application service group using the service group list for backup generation purposes, and (iii) orchestrating generation of the backup by the identified virtual machine.

To maintain the service group list (264), the virtual machine integrated backup agent (254) may monitor respective states of each virtual machine of an application service group associated with the service group list (264). For example, the virtual machine integrated backup agent (254) may monitor the functionality of each of the virtual machines of the application service group. Based on the monitoring, virtual machine integrated backup agent (254) may update the service group list (264).

To identify the virtual machine of the application service group using the service group list for backup generation purposes, the virtual machine integrated backup agent (254) may rank the virtual machines of the application service group based on the information included in the service group list. The virtual machine may be identified as the virtual machine having the highest rank. The ranks of the virtual machines of the application service group may be determined so that a virtual machine having sufficient computational resources for generating the backup efficiently may be identified.

To orchestrate generation of the backup by the identified virtual machine, the virtual machine integrated backup agent (254) may send a backup generation request to the identified virtual machine. The virtual machine integrated backup agent (254) may monitor the backup generation process performed by the identified virtual machine. If the backup is not generated successfully and/or stored in backup storage successfully, the virtual machine integrated backup agent (254) may identify a second virtual machine for generating the backup. The process may be repeated until the backup is successfully generated.

The identified virtual machine may sometimes be the virtual machine hosting the virtual machine integrated backup agent (254). In such a scenario, the example virtual machine (250) hosting the virtual machine integrated backup agent (254) may generate the backup for the application service group.

To provide the functionality of the virtual machine integrated backup agent (254), the virtual machine integrated backup agent (254) may perform all, or a portion, of the methods illustrated in FIGS. 4-5.

In one or more embodiments of the invention, the persistent storage (260) is a logical storage (e.g., virtualized storage) that utilizes any quantity of hardware storage resources of a production host (and/or other entity) that hosts the example virtual machine (250). For example, the persistent storage (260) may utilize portions of any combination of hard disk drives, solid state disk drives, tape drives, and/or any other physical storage medium of a production host and/or other entity for providing storage resources. The persistent storage (260) may store the application data (262), the service group list (264), and/or other data structures. Each of these data structures is discussed below.

In one or more embodiments of the invention, the application data (262) is a data structure that stores information generated by the applications (252). For example, the application data (262) may include databases, image files, document files, and/or any other type and/or combination of data structures.

In one or more embodiments of the invention, the service group list (264) is a data structure that stores information regarding each entity of an application service group. For example, the service group list (264) may include an identifier of each entity of an application service group, a preference of each entity of the application service group, and/or a priority for backup generation purposes of each entity of the application service group. The service group list (264) may include additional, less, and/or different information regarding an application service group without departing from the invention.

The preference for each entity specified by the service group list (264) may specify whether the associated entity is preferred to perform a backup generation for the application service group. For example, the preference may be an identifier that specifies whether the associated entity is preferred to perform the backup generation. The preferences for each entity specified by the service group list (264) may be set by an administrator. The preference for each entity specified by the service group list (264) may be set via other methods without departing from the invention. For example, the preference may be set based on heuristically obtaining information regarding the backup generation success rate of an associated entity. Such information may be obtained from the system automatically by the virtual machine integrated backup agent (254) as backups for the application service group are generated.

The priority for backup generation purposes of each entity specified by the service group list (264) may specify the relative importance of each entity of the application service group for providing application services. For example, entities specified by the service group list (264) that provide failover functionality may have a lower priority than other entities specified by the service group list (264) that actually provide application services to clients when all of the entities of the application service group are operational.

To further explain application service groups, a relationship diagram in accordance with one or more embodiments of the invention is shown in FIG. 3. The relationship diagram illustrates relationships between various entities of the system of FIG. 1.

For example, as shown in FIG. 3, an application service group (300) may be associated with the service type (302). In other words, all of the virtual machines associated with an application service group (300) may provide a service type (302). The service type (302) may be, for example, database services, electronic mail services, file storage services, or any other type of computer incremented service.

Additionally, each application service group (300) may be associated with any number of virtual machines (e.g., 304.2, 304.4). For example, an application service group (300) may include 1, 2, 5, 12, 50, 100, etc. virtual machines. The virtual machines of the application service group may cooperatively provide the services specified by the service type (302).

In one or more embodiments of the invention, all of the virtual machines of an application service group host at least one copy of an application (306). For example, all of the virtual machines of an application service group may host a database application. A portion of the virtual machines may actively provide database services while a second portion of the virtual machines may not provide database services. The second portion of the virtual machines may provide failover services for the portion of the virtual machines.

Additionally, in one or more embodiments of the invention, all of the virtual machines of an application service group host at least one copy of application data (308). For example, all of the virtual machines of an application service group may host a database application. To ensure that all of the instances of the database application are able to provide similar application services, each of the virtual machines may store a copy of the application data (308). Even though not all of the virtual machines may be providing such services, each may maintain a copy of the application data (308) so that if a need to provide such services arises any of the instances of the database application may be capable of providing the desired services.

Returning to FIG. 1, the remote agents may orchestrate generation of backups of components of the system of FIG. 1. FIG. 4 illustrates a method that may be performed by components of the system of FIG. 1 when orchestrating backup generations.

FIG. 4 shows a flowchart of a method in accordance with one or more embodiments of the invention. The method depicted in FIG. 4 may be used to generate a backup in accordance with one or more embodiments of the invention. The method shown in FIG. 4 may be performed by, for example, remote agents (e.g., 110, FIG. 1). Other components of the system illustrated in FIG. 1 may perform all, or a portion, of the method of FIG. 4 without departing from the invention.

While FIG. 4 is illustrated as a series of steps, any of the steps may be omitted, performed in a different order, additional steps may be included, and/or any or all of the steps may be performed in a parallel and/or partially overlapping manner without departing from the invention.

In step 400, a backup generation event is identified.

In one or more embodiments of the invention, the backup generation event is the occurrence of a predetermined point in time. For example, the remote agents may orchestrate the generation of backups based on backup policies stored in the remote agents or other locations. The backup policies may specify when backups are to be generated, for what entities the backups are to be generated, where the backups are to be stored, and/or other information regarding the process of generating a backup upon the occurrence of the predetermined event such as a predetermined point in time specified by a schedule that specifies when backups are to be generated.

The backup generation event may be other types of events without departing from the invention. For example, the backup generation event may be the amount of data associated with an application service group reaching a predetermined quantity.

In step 402, an application service group associated with the backup generation event is identified. The application service group may be identified based on information included in a backup policy. For example, the backup policy may specify the identity of the application service group and that a backup for the application service group is to be generated in response to the occurrence of the backup generation event.

In step 404, all entities associated with the application service group are identified. The entities associated with application service group may be identified by an association between the entities in the application service group. For example, a remote agent or another entity may maintain a listing of all of the application services groups. Listing may further specify the entities that are members of each of the application services groups. The listing may further include identification information for each of the listed entities associated with each of the application service groups.

In step 406, an application service group backup generation request is sent to at least one of the identified entities. The application service group backup generation request may specify that a backup is to be generated for the application service group identified in step 402. For example, a message requesting that a backup be generated for the application service group may be sent to the at least one of the identified entities.

In one or more embodiments of the invention, the application service group backup generation request is sent to all of the identified entities. In other words, the request may be sent to all members of the application service group.

After sending the application service group backup generation request, the remote agent may not otherwise orchestrate generation of the backup. Consequently, the involvement of the remote agent for backup generation orchestration may be limited.

After sending the application service group backup generation request, the remote agent may receive information regarding the generated backup from the application service group. For example, a confirmation indicating that the backup was generated and stored in backup storage may be received and/or information regarding the generated backup may be received.

The method may end following step 406.

As discussed above, production hosts may generate backups for data integrity purposes. FIG. 5 shows a flowchart of a method in accordance with one or more embodiments of the invention. The method depicted in FIG. 5 may be used to generate a backup for an application service group in accordance with one or more embodiments of the invention. The method shown in FIG. 5 may be performed by, for example, a production host (e.g., 130, FIG. 1). Other components of the system illustrated in FIG. 1 may perform all, or a portion, of the method of FIG. 5 without departing from the invention.

While FIG. 5 is illustrated as a series of steps, any of the steps may be omitted, performed in a different order, additional steps may be included, and/or any or all of the steps may be performed in a parallel and/or partially overlapping manner without departing from the invention.

In step 500, an application service group backup generation request for an application service group is obtained.

In one or more embodiments of the invention, the application service group backup generation request is obtained from a remote agent. The obtained application service group backup generation request may indicate that a backup for an application service group is to be generated.

In one or more embodiments of the invention, the application service group backup generation request is obtained by a virtual machine hosted by the production host and the virtual machine is a member of the application service group.

In step 502, virtual machines associated with the application service group are identified. The virtual machines associated with the application service group may be identified using a service group list. For additional details regarding a service group list, refer to FIG. 2.2.

In step 504, the virtual machines identified in step 502 are ranked. The ranking may be based on (i) service group preferences specified by the service group list, (ii) the priority of each of the virtual machines specified by the service group list, and/or (iii) backup generation failures of each of the identified virtual machines.

In one or more embodiments of the invention, the virtual machine having the highest preference is ranked the highest. If multiple virtual machines have the same highest preference, the virtual machines may be ranked based on an order specified by their respective identifiers. For example, the virtual machines having the same highest preference may be ranked alphabetically based on each of their names.

If the virtual machines having the highest preference are unavailable, for backup generation purposes, the priorities of each of the virtual machines specified by the service group list may be used to rank the virtual machines. If multiple virtual machines have the same highest priority, the virtual machines may be ranked based on an order specified by their respective identifiers. For example, the virtual machines having the same highest priority may be ranked alphabetically based on each of their names.

If any of the virtual machines have not successfully generated previous backups, such virtual machines may be reduced in ranking so that they are ranked at the bottom of the ranks.

The resulting ranking of the virtual machines identified in step 502 may be stored for future use.

In step 506, one virtual machine of the virtual machines identified in step 502 is identified based on rankings of the virtual machines for generating the backup. For example, the highest ranking virtual machine of the ranked virtual machines may be identified for backup generation purposes.

In step 508, the backup for the application service group is attempted to be generated using the virtual machine identified in step 506.

In one or more embodiments of the invention, the backup is attempted to be generated by sending instructions to generate the backup to the virtual machine identified in step 506. For example, a backup generation request may be sent to the identified virtual machine. The backup generation request may specify the type of backup to be generated. For example, the backup generation request may specify that an application level backup for a particular application that provides services associated with application service group be generated.

In one or more embodiments of the invention, the backup is attempted to be generated by the virtual machine that performed the ranking of step 504. For example, the virtual machine that performed the ranking of step 504 may be the highest ranking virtual machine. In such a scenario, the virtual machine itself may attempt to generate the backup.

In step 510, it is determined whether the backup for the application service group was generated. For example, the one virtual machine of step 508 that was to generate the backup may be queried with a request for the status of the backup generation. If the one virtual machine indicates that the backup was properly generated, it may be determined that the backup was generated properly. Alternatively, a backup storage may be queried with respect to the backup. If the backup is stored in backup storage, it is determined that the backup was successfully generated.

If the backup was successfully generated, the method may end following step 510.

If the backup was not successfully generated, the method may return to step 504.

In one or more embodiments of the invention, all of the virtual machines of the application service group perform the method of FIG. 5 in parallel. Consequently, failure of any virtual machine during the backup generation process may not impact whether or not the backup is generated successfully. In other words, if any of the virtual machines failed during the backup generation process, the other virtual machines of the application service group may also be performing the process and consequently complete the process in the absence of the failed virtual machine.

To further clarify embodiments of the invention, a non-limiting example is provided in FIGS. 6.1-6.7. Each of these figures may illustrate a system similar to that illustrated in FIG. 1 at different points in times. For the sake of brevity, only a limited number of components of the system of FIG. 1 are illustrated in each of FIGS. 6.1-6.7.

Example

Consider a scenario as illustrated in FIG. 6.1 in which the application service group (600) is providing database services to clients (620). The application service group (600) includes a first virtual machine (602.2), a second virtual machine (602.4), and the third virtual machine (602.6). To improve the reliability providing database services to the clients (620), the first virtual machine (602.2) is providing the database services while the second virtual machine (602.4) and the third virtual machine (602.6) are providing failover services for the first virtual machine (602.2).

To provide failover services, the second virtual machine (602.4) and the third virtual machine (602.6) are maintaining mirrored copies of the application data associated with the database services provided by the first virtual machine (602.2).

To improve reliability of the application data associated with the application services provided by the application service group (600), a remote agent (610) is providing data protection services to the application service group (600) by managing the generation and storage of backups of the application data utilized by the application service group (600) in backup storage. The remote agent (610) provides such services in accordance with a backup policy that specifies that a backup for the application service group (600) is to be generated at a first point in time.

In response to the occurrence of the first point in time, the remote agent (610) generates a backup generation request for the application service group (600) and sends the generated backup generation request to each of the virtual machines (602.2, 602.4, 602.6). The backup generation request specifies that a backup of the application data associated with the services provided by the application service group (600) is to be stored in the backup storage (630).

Upon receiving the backup generation request, the virtual machines utilize an application service group list (604) to create a ranking of the virtual machines for backup generation purposes. Because the first virtual machine (602.2) is providing the database services to the clients (620), first virtual machine (602.2) is ranked last for backup generation purposes. The second virtual machine (602.4) and the third virtual machine (602.6) are preferred for backup generation purposes because neither is providing the services provided by the application service group (600) to the clients (620). Consequently, both are ranked the same and higher than the first virtual machine (602.2). To differentiate the rankings of the second virtual machine (602.4) and the third virtual machine (602.6), the identifiers of these virtual machines are placed in alphabetical order. Because the second virtual machine (602.4) comes before the third virtual machine (602.6) alphabetically, the second virtual machine (602.4) is ranked first, the third virtual machine (602.6) is ranked second, and the first virtual machine (602.2) is ranked third for backup generation purposes.

Using the aforementioned rankings, the second virtual machine (602.4) is selected to generate the backup for the application service group (600). In response to the selection, the second virtual machine (602.4) generates an application service group backup (606) as shown in FIG. 6.2. The application service group backup (606) is based on the copy of the application data maintained by the second virtual machine (602.4).

After generating the application service group backup (606), the second virtual machine (602.4) sends the generated backup to the backup storage (630). Upon receipt, the backup storage (630) stores a copy of the application service group backup (632) as shown in FIG. 6.3. In the state shown in FIG. 6.3, the copy of the application service group backup (632) may be used to restore a state of the application hosted by the virtual machines (602.2, 602.4, 602.6) that is able to provide the application services desired by the clients (620).

After storing the copy of the application service group backup (632), the first virtual machine (602.2) fails as shown in FIG. 6.4. Consequently, the application services desired by the clients (620) are not available to the application service group (600).

To continue providing the desired application services, the second virtual machine (602.4) begins providing application services to the clients (620) as part of providing failover services. Thus, the clients (620) are able to immediately start receiving their desired services from the application service group (600).

While the second virtual machine (602.4) is providing application services, the remote agent (610) begins to orchestrate restoration of the application service group (600) by instantiating a fourth virtual machine (602.8) as shown in FIG. 6.5. Upon instantiation, the fourth virtual machine (602.8) obtains a copy of the application service group list (604) so that it can participate in the application service group (600).

To place the application service group (600) back into a pre-failure state, the remote agent (610) initiates an application level restoration for the fourth virtual machine (602.8) by orchestrating a transfer of a copy of the application service group backup (632) to the fourth virtual machine (602.8) as shown in FIG. 6.6. Once transferred, the copy of the application service group backup (608) is used to restore a copy of the application data of the fourth virtual machine (602.8). After restoration of the application data, the fourth virtual machine (602.8) takes over providing of the application services to the clients (620) as shown in FIG. 6.7.

Thus, in the state shown in FIG. 6.7, the virtual machines (602.8, 602.4, 602.6) of the application service group (600) have been restored so that the fourth virtual machine (602.8) is able to provide application services desired by the clients (620) while the second virtual machine (602.4) and the third virtual machine (602.6) were able to provide failover services for the fourth virtual machine (602.8). By doing so, application services desired by the clients (620) are able to be continuously provided even during failure of one of the virtual machines of the application service group (600).

End of Example

Figure 7:
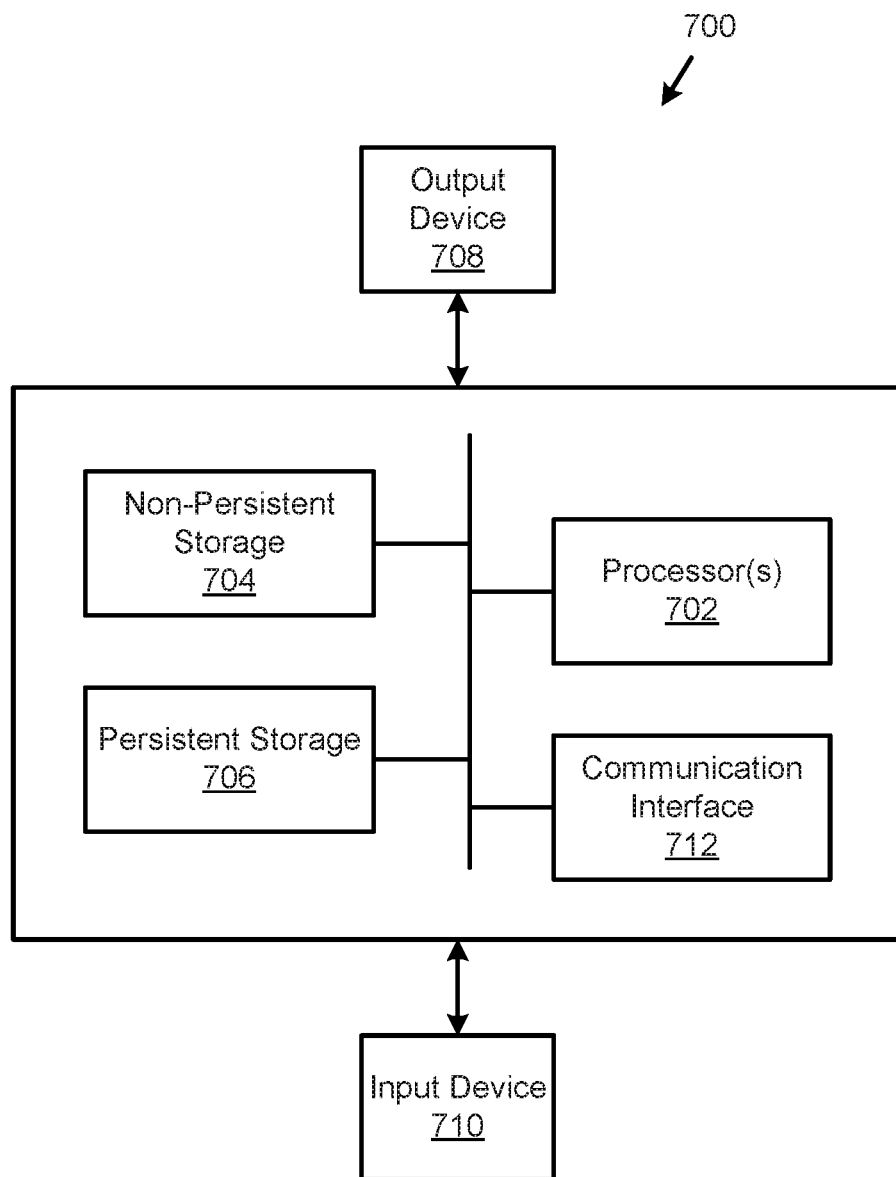
FIG. 7 shows a diagram of a computing device in accordance with one or more embodiments of the invention.

Any of the components of FIG. 1 may be implemented as distributed computing devices. As used herein, a distributed computing device refers to functionality provided by a logical device that utilizes the computing resources of one or more separate and/or distinct computing devices. As discussed above, embodiments of the invention may be implemented using computing devices. FIG. 7 shows a diagram of a computing device in accordance with one or more embodiments of the invention. The computing device (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), input devices (710), output devices (708), and numerous other elements (not shown) and functionalities. Each of these components is described below.

In one embodiment of the invention, the computer processor(s) (702) may be an integrated circuit for processing instructions. For example, the computer processor(s) may be one or more cores or micro-cores of a processor. The computing device (700) may also include one or more input devices (710), such as a touchscreen, keyboard, mouse, microphone, touchpad, electronic pen, or any other type of input device. Further, the communication interface (712) may include an integrated circuit for connecting the computing device (700) to a network (not shown) (e.g., a local area network (LAN), a wide area network (WAN) such as the Internet, mobile network, or any other type of network) and/or to another device, such as another computing device.

In one embodiment of the invention, the computing device (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing devices exist, and the aforementioned input and output device(s) may take other forms.

Embodiments of the invention may provide a system that is able to continuously provide desired services to clients while components of the system are in failed states. Specifically, embodiments of the invention may provide a method for backup generation within a distributed system that limits the computational load placed on an orchestrator of the distributed system. By limiting the computational load placed on the orchestrator, the orchestrator is able to orchestrate backup services to a larger number of components of the distributed system. Consequently, the system may efficiently scale to greater numbers of components while limiting the number of orchestration entities required for managing operation of the system.

Thus, embodiments of the invention may address the problem of management of a distributed system. Specifically, embodiments of the invention may improve the number of components that may be managed by an orchestrator by limiting the computational load placed on the orchestrator for system management purposes.

The problems discussed above should be understood as being examples of problems solved by embodiments of the invention disclosed herein and the invention should not be limited to solving the same/similar problems. The disclosed invention is broadly applicable to address a range of problems beyond those discussed herein.

One or more embodiments of the invention may be implemented using instructions executed by one or more processors of the data management device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A production host, comprising:
   a persistent storage for storing:
      virtual machine data, and
      a service group list associated with an application service group; and
   a backup manager programmed to:
      obtain a backup generation request for the application service group comprising a plurality of virtual machines, wherein each of the virtual machines of the plurality of virtual machines uses a copy of the virtual machine data;
      in response to obtaining the backup generation request:
         identify a first virtual machine of the plurality of virtual machines that is prioritized for generating a backup for the application service group based on the service group list;
         attempt to generate the backup using the first virtual machine and the copy of the virtual machine data;
         store the backup in backup storage; and
      restore a second virtual machine of the plurality of virtual machines using the backup for the application service group,
      wherein only the backup is generated for all of the plurality of virtual machines to satisfy the backup generation request.

2. The production host of claim 1, wherein the service group list specifies the plurality of virtual machines and, for each virtual machine of the plurality of virtual machines:
   a backup generation preference within the application service group;
   a priority for generating the backup; and
   an identifier.

3. The production host of claim 2, wherein each virtual machine of the plurality of virtual machines is programmed to provide a same type of service using the copy of the virtual machine data.

4. The production host of claim 3, wherein the plurality of virtual machines are programmed to only have one virtual machine of the plurality of virtual machines provide the same type of service at any time.

5. The production host of claim 1, wherein the backup manager is further programmed to:
   obtain a second backup generation request for the application service group;
   in response to obtaining the second backup generation request:
      identify the first virtual machine of the plurality of virtual machines for generating a second backup for the application service group using the service group list;
      attempt to generate the second backup using the first virtual machine;
      make a determination that the first virtual machine failed to generate the second backup;
      in response to the determination:
         identify a second virtual machine of the plurality of virtual machines for generating the second backup for the application service group using the service group list;
         attempt to generate the second backup using the second virtual machine and the copy of the virtual machine data; and
         store the second backup in the backup storage.

6. The production host of claim 5, wherein the backup manager is further programmed to:
   identify that the second virtual machine is unavailable; and
   update the service group list to reflect the unavailability of the second virtual machine, wherein updating the service group list prevents the second virtual machine from being identified as being prioritized for generating backups.

7. A method for providing backup services to an application service group, comprising:
   obtaining a backup generation request for the application service group comprising a plurality of virtual machines, wherein each of the virtual machines of the plurality of virtual machines uses a copy of virtual machine data;
   in response to obtaining the backup generation request:
      identifying a first virtual machine of the plurality of virtual machines that is prioritized for generating a backup for the application service group based on a service group list associated with the application service group;
      attempting to generate the backup using the first virtual machine and the copy of virtual machine data;
      storing the backup in backup storage; and
   restoring a second virtual machine of the plurality of virtual machines using the backup for the application service group,
   wherein only the backup is generated for all of the plurality of virtual machines to satisfy the backup generation request.

8. The method of claim 7, wherein the service group list specifies the plurality of virtual machines and, for each virtual machine of the plurality of virtual machines:
- a backup generation preference within the application service group;
- a priority for generating the backup; and
- an identifier.

9. The method of claim 8, wherein each virtual machine of the plurality of virtual machines provides a same type of service using the copy of virtual machine data.

10. The method of claim 9, wherein only one virtual machine of the plurality of virtual machines provides the same type of service at any time.

11. The method of claim 7, further comprising:
- obtaining a second backup generation request for the application service group;
- in response to obtaining the second backup generation request:
  - identifying the first virtual machine of the plurality of virtual machines for generating a second backup for the application service group using the service group list;
  - attempting to generate the second backup using the first virtual machine;
  - making a determination that the first virtual machine failed to generate the second backup;
  - in response to the determination:
    - identifying a second virtual machine of the plurality of virtual machines for generating the second backup for the application service group using the service group list;
    - attempting to generate the second backup using the second virtual machine and the copy of virtual machine data; and
    - storing the second backup in the backup storage.

12. The method of claim 11, further comprising:
- identifying that the second virtual machine is unavailable; and
- updating the service group list to reflect the unavailability of the second virtual machine, wherein updating the service group list prevents the second virtual machine from being identified as being prioritized for generating backups.

13. A non-transitory computer readable medium comprising computer readable program code, which when executed by a computer processor enables the computer processor to perform a method for providing backup services to an application service group, the method comprising:
- obtaining a backup generation request for the application service group comprising a plurality of virtual machines, wherein each of the virtual machines of the plurality of virtual machines uses a copy of virtual machine data;
- in response to obtaining the backup generation request:
  - identifying a first virtual machine of the plurality of virtual machines that is prioritized for generating a backup for the application service group based on a service group list associated with the application service group;
  - attempting to generate the backup using the first virtual machine and the copy of virtual machine data;
  - storing the backup in backup storage; and
  - restoring a second virtual machine of the plurality of virtual machines using the backup for the application service group,
  - wherein only the backup is generated for all of the plurality of virtual machines to satisfy the backup generation request.

14. The non-transitory computer readable medium of claim 13, wherein the service group list specifies the plurality of virtual machines and, for each virtual machine of the plurality of virtual machines:
- a backup generation preference within the application service group;
- a priority for generating the backup; and
- an identifier.

15. The non-transitory computer readable medium of claim 14, wherein each virtual machine of the plurality of virtual machines provides a same type of service using the copy of virtual machine data.

16. The non-transitory computer readable medium of claim 15, wherein only one virtual machine of the plurality of virtual machines provides the same type of service at any time.

17. The non-transitory computer readable medium of claim 13, wherein the method further comprises:
- obtaining a second backup generation request for the application service group;
- in response to obtaining the second backup generation request:
  - identifying the first virtual machine of the plurality of virtual machines for generating a second backup for the application service group using the service group list;
  - attempting to generate the second backup using the first virtual machine;
  - making a determination that the first virtual machine failed to generate the second backup;
  - in response to the determination:
    - identifying a second virtual machine of the plurality of virtual machines for generating the second backup for the application service group using the service group list;
    - attempting to generate the second backup using the second virtual machine and the copy of virtual machine data; and
    - storing the second backup in the backup storage.

* * * * *